United States Patent [19]

Hirata

[11] Patent Number: 5,436,962
[45] Date of Patent: Jul. 25, 1995

[54] CALL TRANSFER ARRANGEMENT USING NETWORK SERVICES

[75] Inventor: Osamu Hirata, Tokyo, Japan

[73] Assignee: Canon Kabushiki Kaisha, Tokyo, Japan

[21] Appl. No.: 76,366

[22] Filed: Jun. 14, 1993

Related U.S. Application Data

[63] Continuation of Ser. No. 813,496, Dec. 26, 1991, abandoned.

[30] Foreign Application Priority Data

Jan. 9, 1991 [JP] Japan .................. 3-012859

[51] Int. Cl.⁶ .............. H04M 3/42; H04Q 11/04; H04J 3/12
[52] U.S. Cl. .................. 379/212; 370/58.1; 370/110.1; 379/201; 379/214
[58] Field of Search ............ 379/67, 88, 89, 201, 379/210, 211, 212, 203, 214; 370/58.1, 110.1

[56] References Cited

U.S. PATENT DOCUMENTS

| | | | |
|---|---|---|---|
| 4,737,982 | 4/1988 | Boratgis et al. | 379/212 X |
| 4,903,258 | 2/1990 | Kuhlmann et al. | 370/58.2 |
| 4,942,602 | 7/1990 | Baker, Jr. et al. | 379/203 X |
| 5,018,097 | 5/1991 | Kuhlmann et al. | 364/900 |
| 5,047,923 | 9/1991 | Elsther et al. | 364/200 |
| 5,093,825 | 3/1992 | Helsmoortel et al. | 370/58.2 |

FOREIGN PATENT DOCUMENTS

| | | |
|---|---|---|
| 0255169 | 2/1988 | European Pat. Off. |
| 0361760 | 4/1990 | European Pat. Off. |
| 3727952 | 3/1989 | Germany |

Primary Examiner—James L. Dwyer
Assistant Examiner—Harry S. Hong
Attorney, Agent, or Firm—Fitzpatrick, Cella, Harper & Scinto

[57] ABSTRACT

There is provided a method for transferring an incoming telephone call to another station, utilizing the services of a network. The method consists of calling a station of destination by an exchange apparatus; then entering a three-party communication state including the exchange, the station of destination of transfer and the call originating station; and sending a soundless signal from the exchange to the station of destination of transfer and the call originating station, whereby the communication is enabled between these stations, so that the call is apparently transferred to the station of destination.

35 Claims, 4 Drawing Sheets

F I G. 1
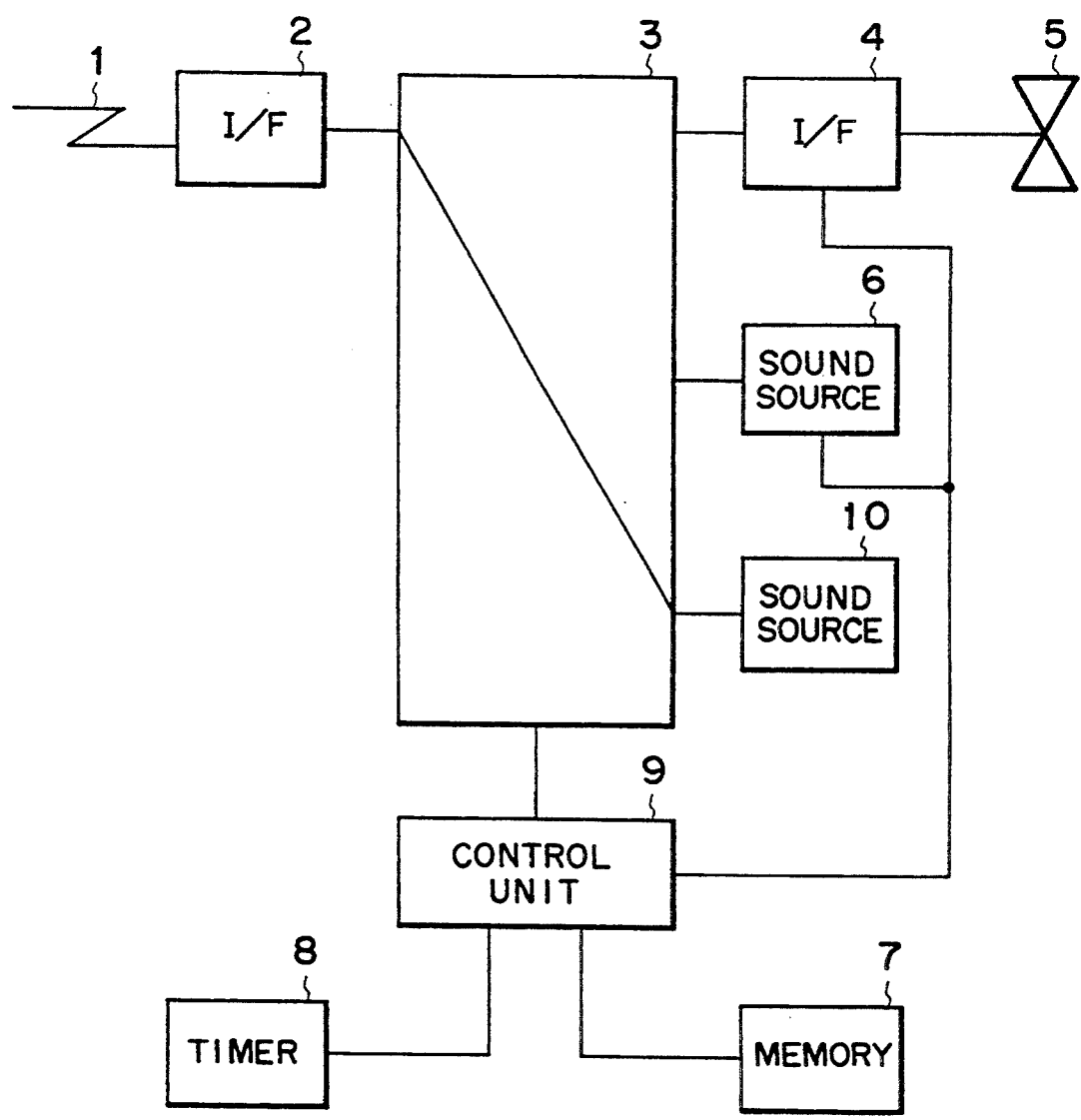

CALL TRANSFER ARRANGEMENT USING NETWORK SERVICES

This application is a continuation of application Ser. No. 07/813,496 filed Dec. 26, 1991, now abandoned.

BACKGROUND OF THE INVENTION

1. Field of the Invention

The present invention relates to a method for transferring a telephone call to a desired destination.

2. Related Background Art

The transfer of an external call has been conducted by a communication apparatus or an internal exchange apparatus with a call transfer function for transferring an incoming call from an analog channel, utilizing another analog channel.

Also the recent progress in ISDN (integrated service digital network) has enabled transfer of an external call, utilizing the supplementary service of ISDN. Such external call transfer relies on "transfer during communication" (a function for transferring a call, in communication by the user, to a third party) or "incoming call transfer" (a function for transferring an incoming call to a third party, without responding to said incoming call), which are the additional services of the ISDN. After such "transfer during communication" or "incoming call transfer" based on the additional services of the ISDN, the call between the transferring side and the ISDN is disconnected. Therefore the ISDN channel at the transferring side is not occupied, and no deterioration of information is involved.

However, after such external call transfer utilizing the additional services of the ISDN, since the call is disconnected from the transferring side as explained above, the state of the transferred call becomes utterly unclear to the transferring side.

SUMMARY OF THE INVENTION

An object of the present invention is to provide a method for transferring a call, utilizing a network three-party communication mode.

Another object of the present invention is to provide an improvement on the call transfer service.

Still another object of the present invention is to improve the administering ability of the transferring side, in case an incoming call is transferred by additional services of a network.

Still another object of the present invention is to effect administration over the communication time or communication charge, in case an incoming call is transferred by additional services of a network.

Still another object of the present invention is to provide an external call transferring method, capable of transferring an incoming call, utilizing a network three-party communication mode, and sending a soundless signal to the caller and to the destination of transfer.

Still other objects of the present invention will become fully apparent from the following description of the embodiments.

BRIEF DESCRIPTION OF THE DRAWINGS

FIG. 1 is a block diagram of an exchange apparatus, adapted for use in an external call transfer method embodying the present invention;

DESCRIPTION OF THE PREFERRED EMBODIMENTS

Figure 2A:
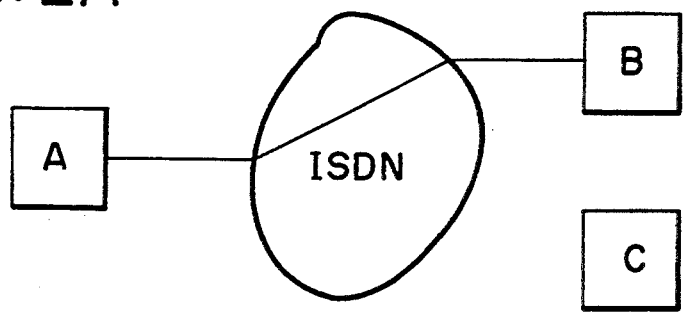
FIGS. 2A to 2D are schematic views showing an example of transfer procedure of the external call transfer method embodying the present invention.

Now the present invention will be clarified in detail by preferred embodiments thereof shown in the attached drawings.

FIG. 1 is a block diagram of an exchange apparatus, serving as a communication apparatus for the external call transfer method of the present invention.

There are shown an ISDN line 1 connected to an ISDN (integral service digital network); a line interface 2 for effecting channel control according to the ISDN user-network interface (CCITT recommendation series I); a time-sharing switch 3 which has a highway connection to an information channel (channel B) from the line interface 2 and effects switching of communication channels to internal lines; an interface 4 for controlling the internal lines; internal terminals 5; a sound source 6 for sending predetermined voice messages to the destination, at the call transfer or according to the available communication time; a memory 7 composed for example of a ROM or a RAM, storing in advance information on the destination, for designating the destination in case of an incoming call from the ISDN line 1; a timer 8 for setting the available communication time and measuring the communication time; a control unit 9 for controlling the above-mentioned units (interfaces 2, 4, sound source 6 etc.) and transferring an incoming call or a call in communication to a third party thereby enabling three-party communication; and a sound source 10 for generating a soundless signal, connected to the line interface 2. As is well known in the art, a signal having a predetermined value (e.g., FF in $\mu$-law PCM coding) is utilized in ISDN to represent a soundless or completely inaudible signal.

FIGS. 2A to 2D illustrate the procedure of external call transfer, in which an exchange A embodying the present invention transfers an incoming call from a communication terminal B to another terminal C.

FIG. 2A shows a state in which the exchange A receives a call from the terminal B through the ISDN, and the exchange A and the terminal B are connected and are in communication.

Figure 2B:
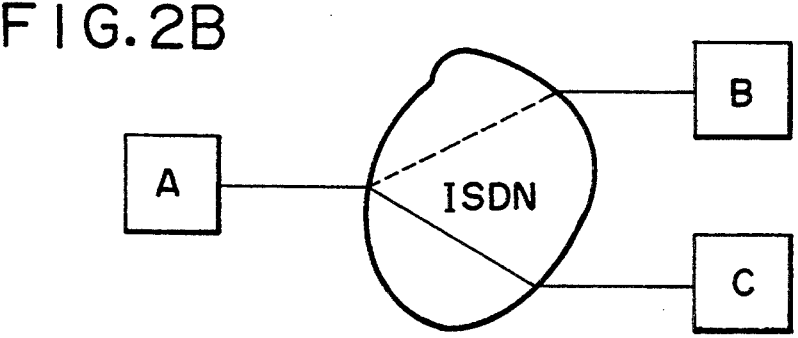
Figure 2C:
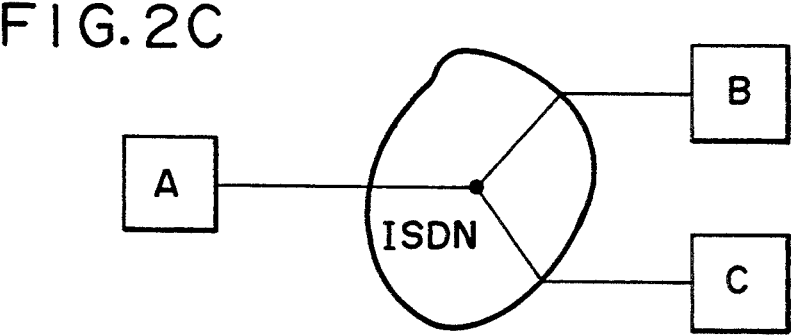
Figure 2D:
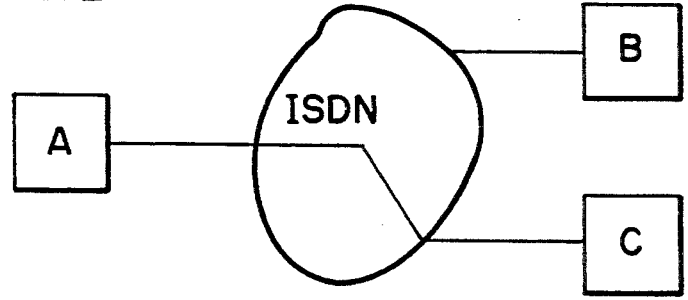

When the exchange A transfers the call from the terminal B to another terminal C, the exchange A temporarily interrupts the communication by holding the call with the terminal B, as indicated by a broken line in FIG. 2B, and calls the terminal C. Then, as shown in FIG. 2C, the exchange A revives the suspended communication with the terminal B and enables three-party communication by a mixing mode. Subsequently the exchange A sends a soundless signal, by the sound source 10, to the terminals B and C, thereby enabling communication between said terminals B and C. In this manner the incoming call from the terminal B to the exchange A is apparently transferred to the terminal C, whereby the terminals B and C enter a communicating state. Exchange A remains connected as shown in FIG. 2C and provides a soundless signal (e.g., an FF code in $\mu$-law PCM coding) which does not contribute to the communication during the communication state of terminals B and C. In this way, an apparent call transfer is effected with the three party communication service of the ISDN.

Figure 3:
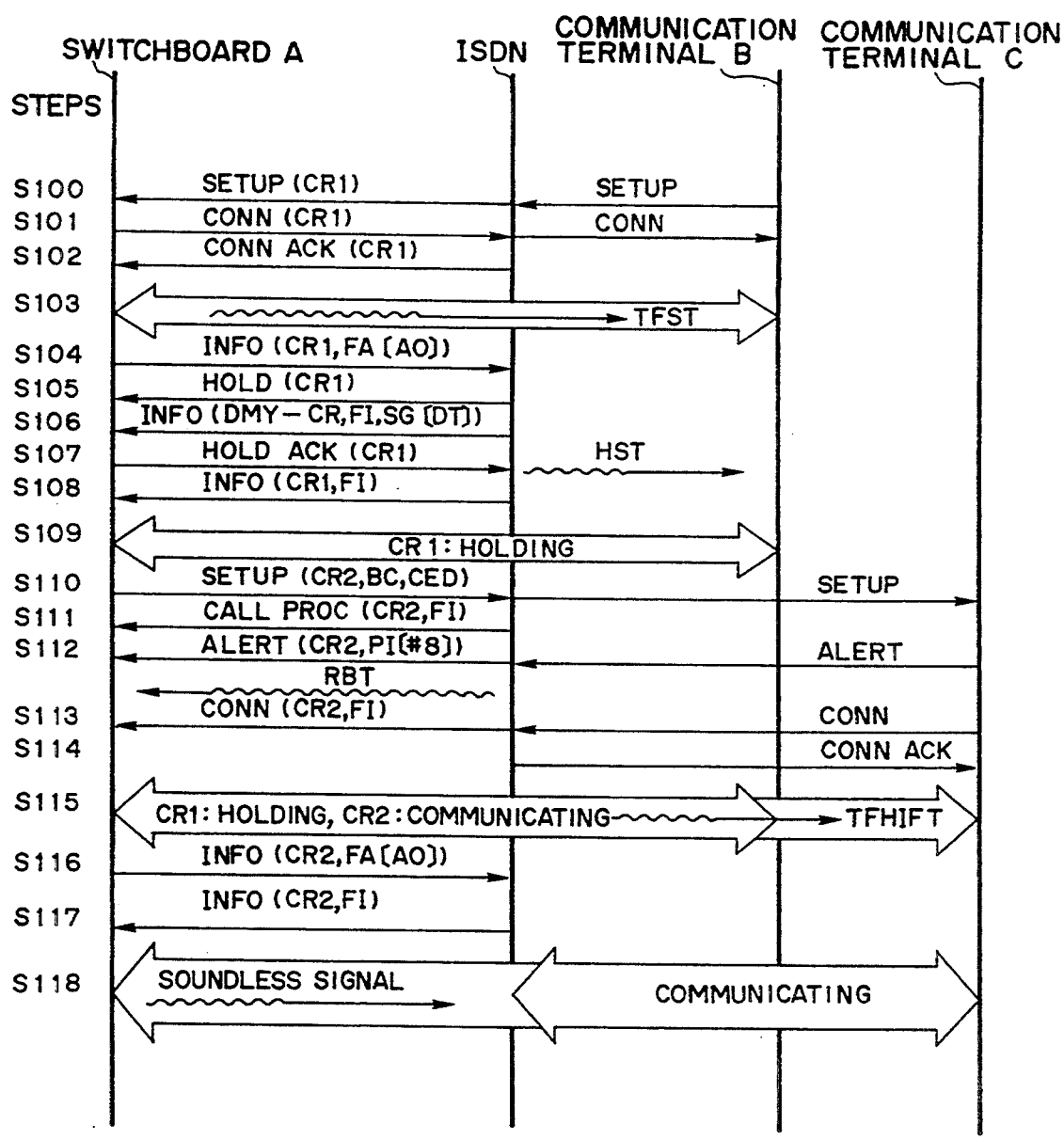
FIG. 3 is a sequence chart showing a first transfer procedure of the external call transfer method of the present invention.

FIG. 3 is a sequence chart in case the exchange or switchboard A transfers the incoming call from the terminal B to the terminal C.

At first the terminal B supplies the ISDN with a "SETUP" command (requesting a call setup) which is sent further from the ISDN to the exchange A (step S100). A call number "CR1" is defined for identifying a call control message for the terminal B, between the exchange A and the ISDN.

Then the exchange A sends, to the ISDN (CR1), a "CONN" command (indicating response by the exchange A). In response, the ISDN sends the "CONN" command to the terminal B (step S101). Subsequently the ISDN supplies the exchange A with a "CONN ACK" command (acknowledgement to CONN) (step S102), whereupon the exchange A and the terminal B enter the communicating state (step S103) (cf. FIG. 2A).

In this state, the control unit 9 of the exchange A connects the interface 2 and the sound source 6 through the time sharing switch 3, and sends a transfer talk message (TFST) such as "Please wait for the call to be transferred" to the terminal B.

Then the control unit 9 of the exchange A reads the information on destination, stored in the memory 7 in advance, and sends, to the ISDN, an "INFO" command including a feature activation ("FA") as additional information (step S104). Then the ISDN sends a "HOLD" command to the exchange A, thereby instructing the holding of the call (step S105). Subsequently the ISDN sends, to the exchange A, an "INFO" command requesting the input of the destination (terminal C) (step S106). Said "INFO" command includes a feature indication ("FI") by a new call number (undetermined dummy call number (DMY-CR)) and a signal (SG[DT] instructing a dial tone generation. In response the control unit 9 of the exchange A sends a "HOLD ACK" command (acknowledgement to "HOLD" command) to the ISDN. Also the ISDN sends a holding sound tone (HST) to the terminal B (step S107). Then, in response to an "INFO" command (FI) sent from the ISDN in a step S108, the control unit 9 of the exchange A enters a prompt state for entering destination, and the terminal B enters a holding state (step S109).

Then, according to the dial information (CED) of the transfer destination, obtained from the memory 7, the control unit 9 of the exchange A sends a "SETUP" command to the ISDN, and said "SETUP" command is sent from the ISDN to the terminal C (step S110). A call number CR2 is defined between the exchange A and the ISDN, for identifying a call control message for the terminal C. Subsequently, the ISDN sends a "CALL PROC" command (process in progress for call setup) to the exchange A, whereby an FI indicating that the transfer is in progress is sent to the control unit 9 of the exchange A (step S111). On the other hand, the terminal C sends, when called, an "ALERT" command (indicating that the terminal C is being called) to the ISDN, which sends said "ALERT" command to the exchange A (step S112). In FIG. 3, PI[#8] indicates that said "ALERT" command is sent by voice service, utilizing a call tone (RBT) constituting the progress tone from the ISDN.

When the terminal C responds, a "CONN" command is sent to the ISDN, which sends, to the exchange A, an FI indicating that transfer to three-party communication is possible, in superposition to said "CONN" command (step S113). Subsequently the ISDN sends a "CONN ACK" command to the terminal C, confirming the response (step S114).

On the other hand, the control unit 9 of the exchange A again connects the sound source 6 and the interface 2 to enter communicating state with the terminal C, and sends thereto a transferring side message (TFHIFT) such as "this is a transferred call". The call between the exchange A and the terminal B is still in the hold state (cf. FIG. 2B) (step S115).

Then the control unit 9 of the exchange A supplies the ISDN with an "INFO" command including an FA for requesting a three-party communication (step S116), and the ISDN supplies the exchange A with an "INFO" command including an FI indicating the completion of connection for three-party communication, whereby the three-party communication by the mixing mode is enabled (cf. FIG. 2C) (step S117).

Then the control unit 9 connects the sound source 10 with the interface 2 and sends the soundless signal from the exchange A to the terminals B and C, thereby enabling communication therebetween (step S118).

Figure 4:
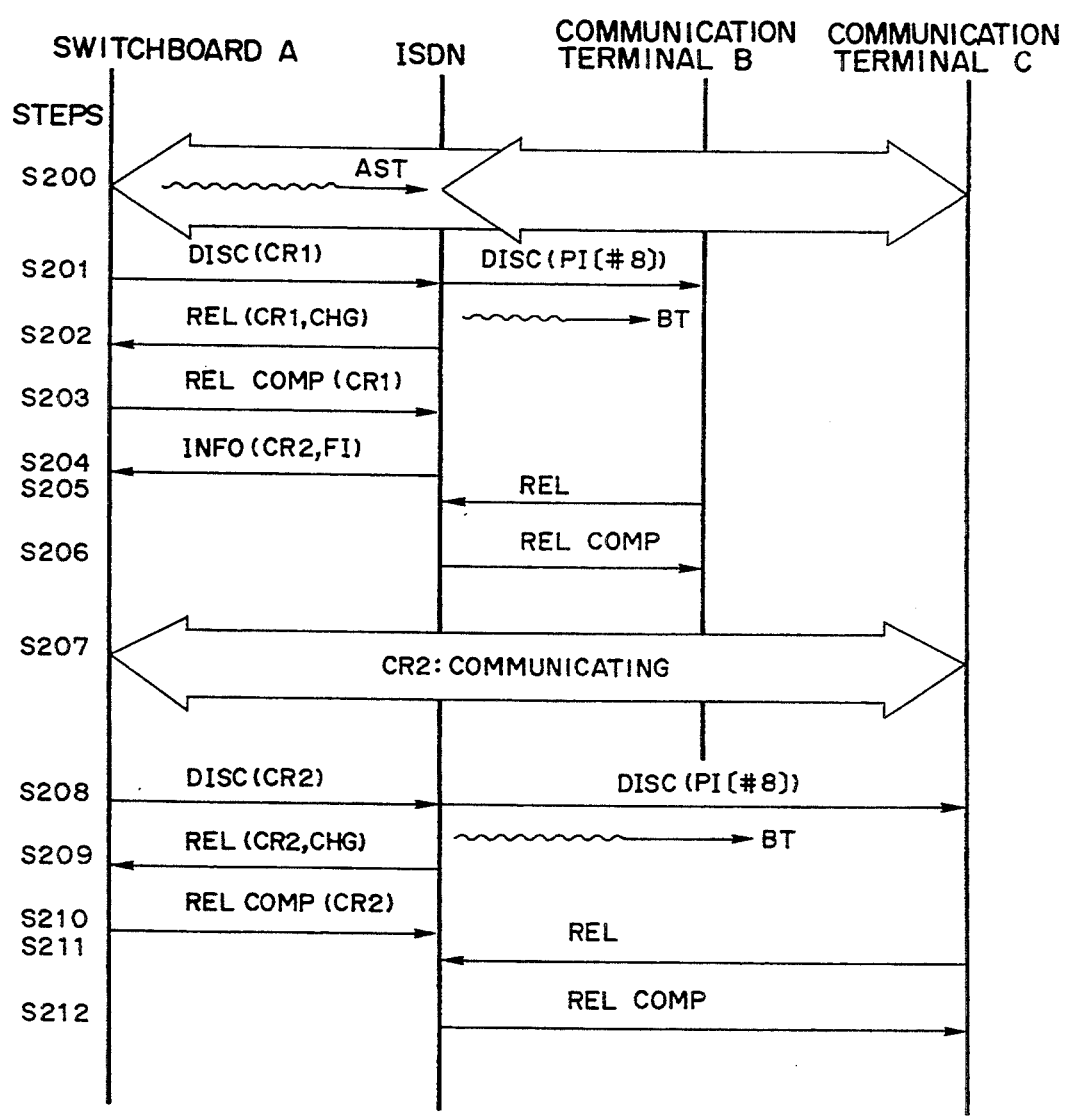
FIG. 4 is a sequence chart showing a second transfer procedure of the external call transfer method of the present invention.

FIG. 4 is a sequence chart for controlling for example the communication time in the communication between the terminals B and C in the three-party communication mode.

When the communication terminals B and C are in communication as explained above, the control unit 9 of the exchange A measures the communication time by the timer 8 and, after the lapse of a predetermined available time, sends an alarm sound (AST) such as "call will be cut off after one minute" by the sound source 6 (step S200). Then said control unit 9 of the exchange A designates the call number CR1 and sends a "DISC" command (requesting disconnection) to the ISDN. In response the ISDN sends said "DISC" command to the terminal B (step S201) and at the same time sends the busy tone (BT) to said terminal B (step S201). Subsequently the ISDN sends, to the exchange A, a "REL" command (information completion of channel disconnection and requesting release of call number CR1) and charge information (CHG) (step S202). Then the control unit 9 of the exchange A supplies the ISDN with a "REL COMP" command, thereby informs completion of release of the channel and the call number CR1 (step S203). Subsequently, the ISDN sends an FI, indicating the end of the three-party communication, by an "INFO" command to the exchange A (step S204). On the other hand, the terminal B sends, to the ISDN, a "REL" command (step S205). In response the ISDN sends a "REL COMP" command to the terminal B (step S206), whereby the call between the exchange A and the terminal B is disconnected, and the exchange A and the terminal C enters the communication state (cf. FIG. 2D).

Then the exchange A disconnects the call with the terminal C. More specifically, the control unit 9 of the exchange A sends a "DISC" command to the ISDN, which then sends a "DISC" command to the terminal C and the busy tone (BT) thereto (step S208). Then the ISDN sends the charge information (CHG) together with a "REL" command to the exchange A (step S209), and, in response, the exchange A sends a "REL COMP" command to the ISDN (step S210). Subsequently the terminal C sends a "REL" command to the ISDN (step S211), which then sends a "REL COMP" command to the terminal C, whereby the disconnection of the call between the exchange A and the terminal C is completed.

In the above-explained external call transfer, the incoming call or the call in communication is transferred to another communication apparatus to enable a three-party communication, and then a soundless signal is sent to the destination. Then an available communication time is set and the measurement of the communication time is started. Subsequently, a predetermined voice message is sent according to said available communication time, and the call is disconnected after the lapse of said available communication time. Consequently the exchange apparatus can easily achieve the transfer of the external call, can control the communication time and can also obtain the charge information on the communication between the terminals B and C. In this manner there can be achieved an improvement on the administering functions of the exchange apparatus.

The present invention is not limited to the foregoing embodiment, but is subject to various modifications within the scope of the appended claims. Though the foregoing embodiment has been limited to the case in which the exchange A transfers a call from the terminal B to another terminal C, the call transfer to the terminal C by the calling terminal B is also possible by a substantially similar process. Also the messages TFST, TFHIFT etc. at the transfer may be omitted.

What is claimed is:

1. A call transfer method for transferring a call from a first station via a transfer side of an exchange to a second station while maintaining the call with the transfer side of the exchange, said method comprising the steps of:
   connecting the first station at the transfer side of the exchange;
   entering a three-party communication state including the first station, the second station and the exchange transfer side; and
   sending a predetermined signal from the exchange to the first station and the second station to maintain the call with the exchange transfer side, said predetermined signal not interfering with communication between the first and second stations.

2. A method according to claim 1, wherein the predetermined signal produces a zero output level.

3. A method according to claim 1, wherein in said sending step, the predetermined signal is sent from a sound source.

4. A method according to claim 1 wherein said entering step further comprises:
   a first step for transmitting a predetermined command to a network from the first station;
   a second step for receiving from the network a response to the predetermined command; and
   a third step for transmitting a command from the first station identifying the second station to the network, in accordance with the response.

5. A method according to claim 1, further comprising:
   a request step for requesting from at least one of the first station, the second station and the exchange to a network a disconnection between the network and the first station and between the network and the second station, subsequent to said sending step.

6. A method according to claim 5, wherein in said request step, a first command for requesting the disconnection between the network and the first station and a second command for requesting the disconnection between the network and the second station are transmitted to the network.

7. A method according to claim 1, wherein, in said connection step, an incoming call from the first station is responded to by the exchange.

8. A method according to claim 1, wherein, in said entering step, a three-party communication service is requested from said first station to a network.

9. A method according to claim 1 wherein in said entering step, a code identifying the second station is transmitted to a network from the exchange.

10. A communication apparatus capable of performing communication through a network with a three-party communication function, comprising:
    connection means for connecting a first station to a transfer side of the communication apparatus;
    request means for requesting, to the network a three-party communication including the first station, a second station connectable to the network and the transfer side of the communication apparatus, and for transferring a call from the first station via the transfer side of the communication apparatus to the second station, while maintaining the call with the transfer side of the communication apparatus; and
    sending means for sending a predetermined signal to the first station and the second station to maintain the call with the transfer side of the communication apparatus, said predetermined signal not interfering with communication between the first and second stations.

11. An apparatus according to claim 10, wherein the predetermined signal produces a zero output level.

12. An apparatus according to claim 10, wherein said sending means sends the predetermined signal from a sound source.

13. An apparatus according to claim 10, wherein the network includes an ISDN.

14. An apparatus according to claim 10, wherein said request means transmits a predetermined command to the network, receives a response to the predetermined command from the network and transmits a command identifying the second station to the network in accordance with the response.

15. An apparatus according to claim 10, wherein said request means further requests to the network a disconnection between the network and the first station and between the network and the second station.

16. An apparatus according to claim 15, wherein said request means transmits a first command for requesting the disconnection between the network and the first station and a second command for requesting the disconnection between the network and the second station.

17. An apparatus according to claim 10, wherein said connection means connects the first station in accordance with an incoming call from the first station.

18. An apparatus according to claim 10, wherein said request means transmits a code identifying the second station to the network.

19. A call transfer method which utilizes services of a network to transfer an incoming call, from a calling station via a network exchange to a transfer destination station, comprising the steps of:
    responding, at a transfer side of the network, to the incoming call from the calling station;
    requesting, from the network transfer side, to the network a three-party communication state including the calling station, the transfer destination station and the transfer side of the network, utilizing the network services; and sending a predetermined signal from the network transfer side to the calling station and the transfer destination station to maintain the call with the network exchange, said predetermined signal not interfering with communication between the calling station and the transfer destination station.

20. A method according to claim 19, wherein the predetermined signal produces a soundless output.

21. A method according to claim 19, wherein, in said sending step, the predetermined signal is sent from a sound source.

22. A method according to claim 19, wherein the network services include ISDN services.

23. A method according to claim 19, wherein said request step further comprises:
a first step for transmitting a predetermined command to a network;
a second step for receiving from the network a response to the predetermined command; and
a third step for transmitting a command identifying the transfer destination station to the network, in accordance with the response.

24. A method according to claim 19, further comprising:
a second request step for requesting to a network from at least one of the calling station and the transfer destination station a disconnection between the network and the calling station and between the network and the transfer destination station, subsequent to said sending step.

25. A method according to claim 24, wherein, in said second request step, a first command for requesting the disconnection between the network and the calling station and a second command for requesting the disconnection between the network and the transfer destination station are transmitted to the network.

26. A method according to claim 19, wherein in said request step, a code identifying the transfer destination station is transmitted to the network.

27. A call transfer method for transferring a call from a first station via a transfer side to a second station while maintaining the call with the transfer side, comprising:
a connecting step for connecting the first station at the transfer side of an exchange;
an entering step for entering a three-party communication state including the first station, the second station and the transfer side; and;
a sending step for sending a predetermined signal from the transfer side to the first station and the second station to maintain the call with the transfer side, the predetermined signal not interfering with a communication between the first and second stations.

28. A method according to claim 27, wherein the predetermined signal produces a zero output level.

29. A method according to claim 27, wherein said entering step further comprises:
a first step for transmitting a predetermined command to a network from the first station;
a second step for receiving from the network a response to the predetermined command; and
a third step for transmitting a command from the first station identifying the second station to the network, in accordance with the response.

30. A method according to claim 27, further comprising:
a requesting step for requesting from at least one of the first station, the second station and the exchange to a network a disconnection between the network and the first station and between the network and the second station, subsequent to said sending step.

31. A method according to claim 30, wherein, in said requesting step, a first command for requesting the disconnection between the network and the first station and a second command for requesting the disconnection between the network and the second station are transmitted to the network.

32. A method according to claim 27, wherein, in said entering step, a three-party communication service is requested from the first station to a network.

33. A method according to claim 27, wherein, in said entering step, a code identifying the second station is transmitted to a network from the exchange.

34. A method according to claim 27, wherein in said sending step, the predetermined signal is sent from a sound source.

35. A method according to claim 27, wherein, in said connecting step, an incoming call from the first station is responded to by the exchange.

* * * * *